(No Model.)
J. A. BLAIR.
VALVE.
No. 526,176.  Patented Sept. 18, 1894.
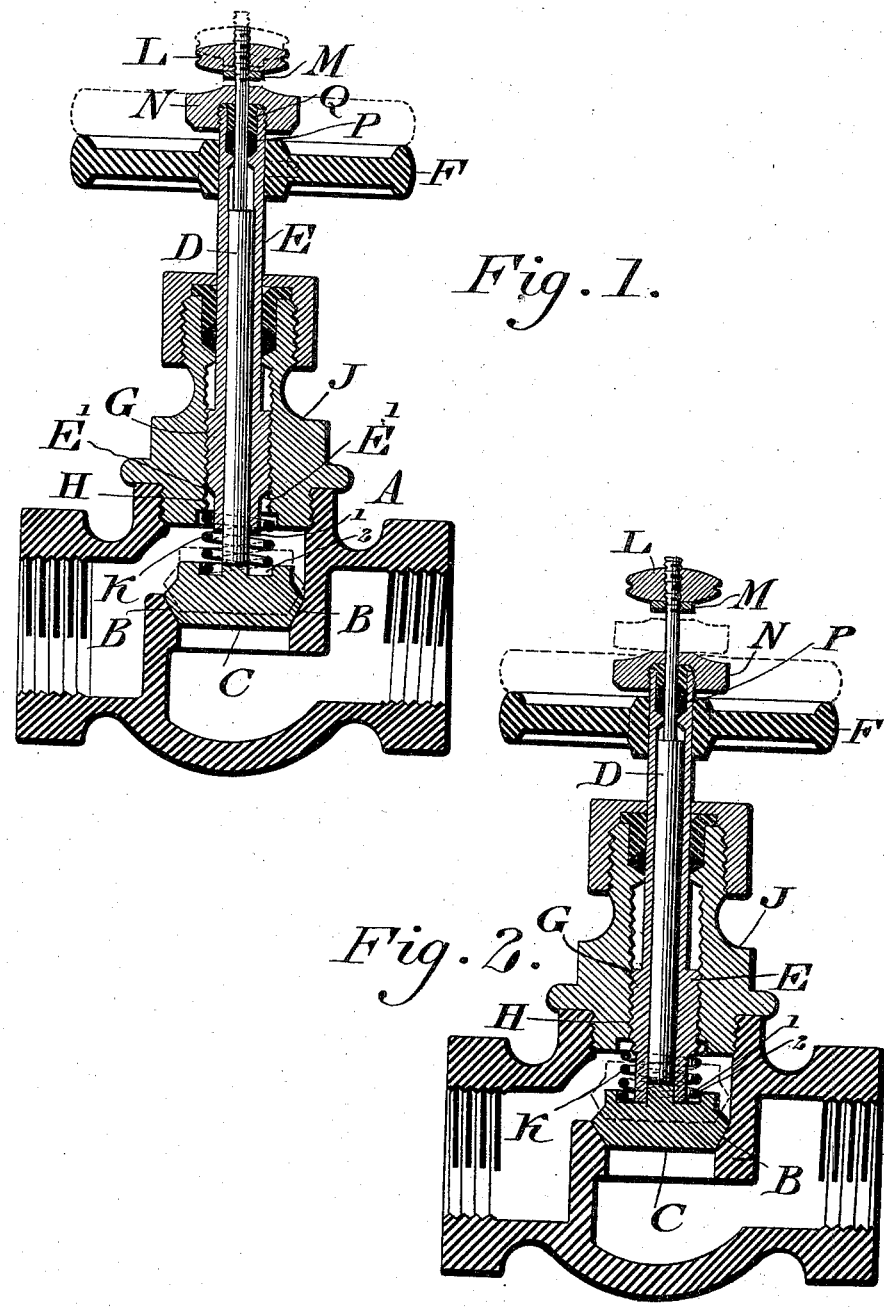

UNITED STATES PATENT OFFICE.

JOHN A. BLAIR, OF PHILADELPHIA, PENNSYLVANIA.

VALVE.

SPECIFICATION forming part of Letters Patent No. 526,176, dated September 18, 1894.

Application filed May 11, 1893. Serial No. 473,799. (No model.)

*To all whom it may concern:*

Be it known that I, JOHN A. BLAIR, a citizen of the United States, residing in the city and county of Philadelphia, State of Pennsylvania, have invented a new and useful Improvement in Valves, which improvement is fully set forth in the following specification and accompanying drawings.

My invention consists of a valve formed of parts hereinafter set forth and claimed, whereby the valve may be formed into a relief, a lift, or positive stop valve.

Figures 1 and 2 represent sections of a valve embodying my invention.

Similar letters of reference indicate corresponding parts in the two figures.

Referring to the drawings: A designates the shell of the valve; B, the valve seat, and C the valve head of valve proper.

D designates a stem which is connected with the head C, and passed freely through the hollow stem E, to which latter is secured the hand wheel F, whereby said stem E may be rotated and as said stem is threaded as at G, and engages with threads H on the interior of the neck J of the valve, the stem E may be raised and lowered. Seated on the base of the neck J and top of the head C, is a coiled or other spring K, whose pressure is exerted downwardly on said head. The upper end of the stem D is threaded and carries a milled nut L, below which is a jam nut M, and cap N, the latter being freely fitted on said stem, and being screwed to the upper end of the hollow or tubular stem E. The jam nut M is adapted to lock or secure the milled nut L from moving from the position in which it is placed. Between the jam nut M and the cap N is a small space which shows that the spring has full control of the valve C, in which position it is used as a relief or snifting valve. By turning the wheel F, the cap N is brought against the jam nut M, thus raising the valve C, making it a lift valve. Again, by placing the valve in first position with the small space between the nut M and cap N, and screwing wheel F, the parts 1 and 2 on the lower end of the stem E and the upper face of the head C, respectively are placed in contact, thus making a positive stop valve.

Within the stem E is a packing P, which is compressed against the stem D by means of the stuffing box Q, which enters said stem E, and is held in position by the cap N, thus preventing leakage between the two stems.

It will be seen that the tension of the spring K may be adjusted by means of the nut L, which by being screwed on the threaded upper end of the stem D so as to bear against the cap N, raises the said valve so as to contract the spring, it being evident that by this provision the head C may be held closed on its seat by the action of said spring, so as to open when the pressure on the under side of said head exceeds that for which it is set, whereby the valve may be relieved, and bursting of the pipe connected with the valve, or the source of supply of steam or other fluid may be prevented. When the stem E is screwed down, the spring K will be engaged by the shoulder E' on the stem E, and consequently compressed, forcing down the valve C on its seat, closing the same. When said stem is raised sufficiently, said head leaves its seat and the valve is opened, the effect of which is evident.

Having thus described my invention, what I claim as new, and desire to secure by Letters Patent, is—

A valve shell with a valve seat, a neck on said shell, a hollow stem with screw-threaded engagement with said neck, a valve head with a stem, a cap on the threaded upper end of the hollow stem, a nut on the upper threaded end of the valve stem, and a coiled spring between said neck and valve head said hollow stem having a shoulder which may also engage said spring, said parts being combined substantially as described.

JOHN A. BLAIR.

Witnesses:
JOHN A. WIEDERSHEIM,
R. H. GRAESER.